Patented Dec. 16, 1947

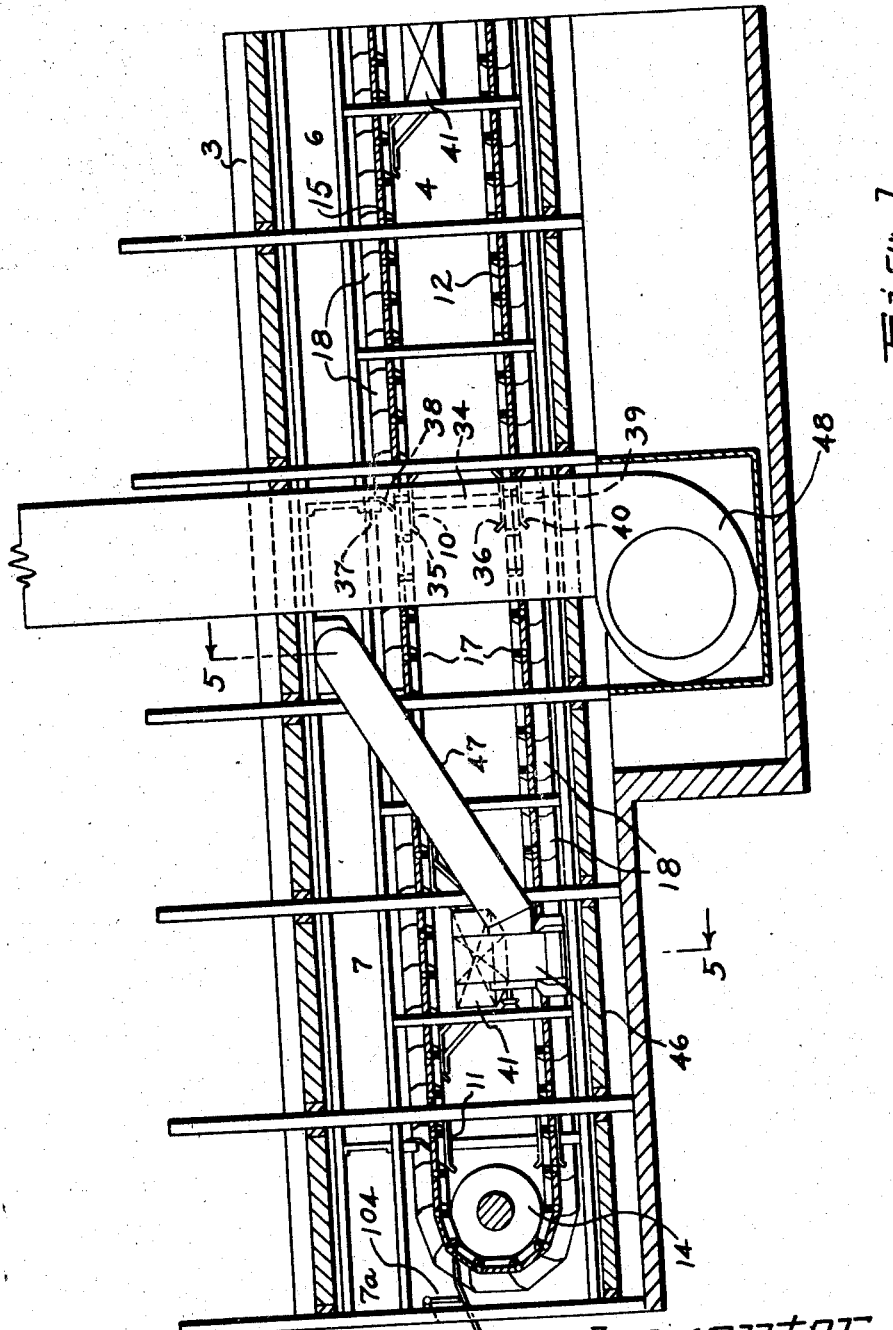

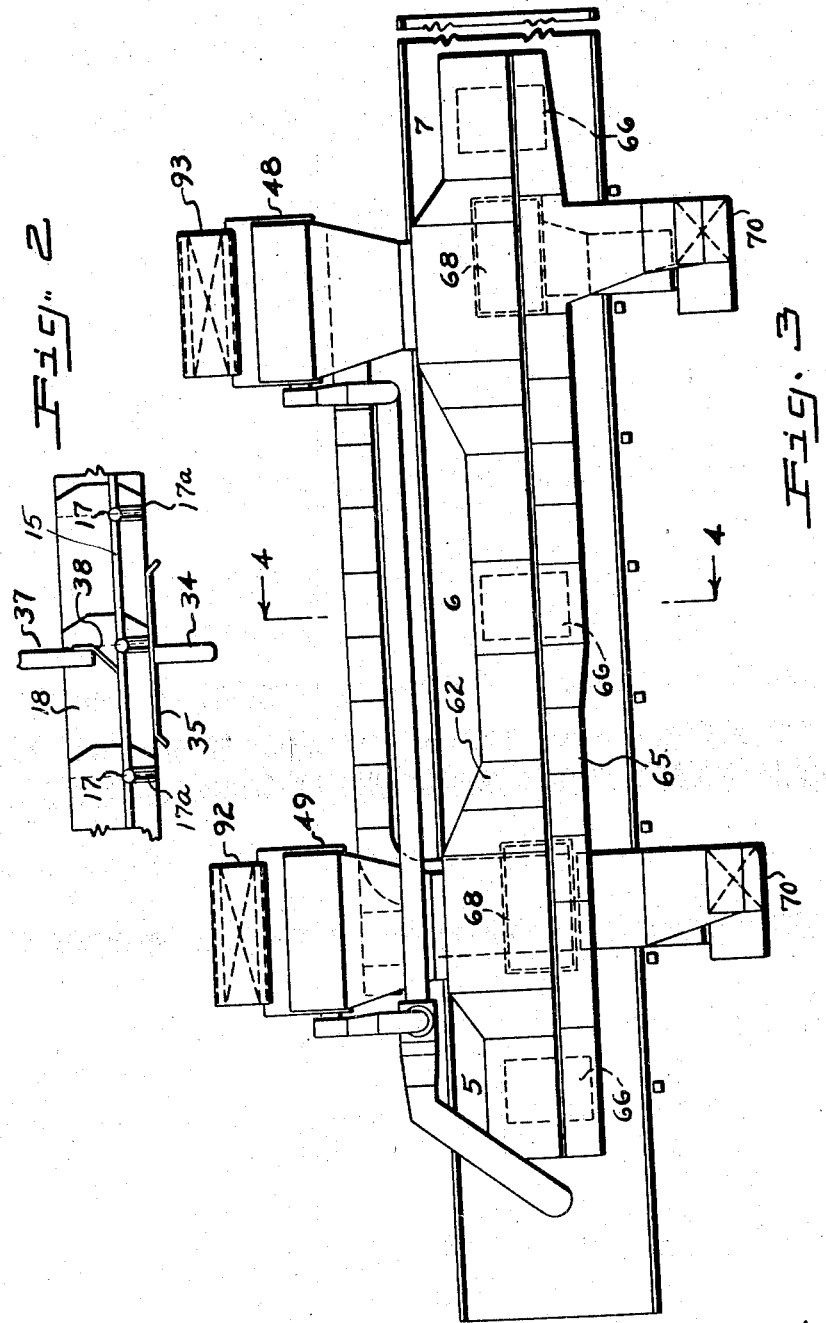

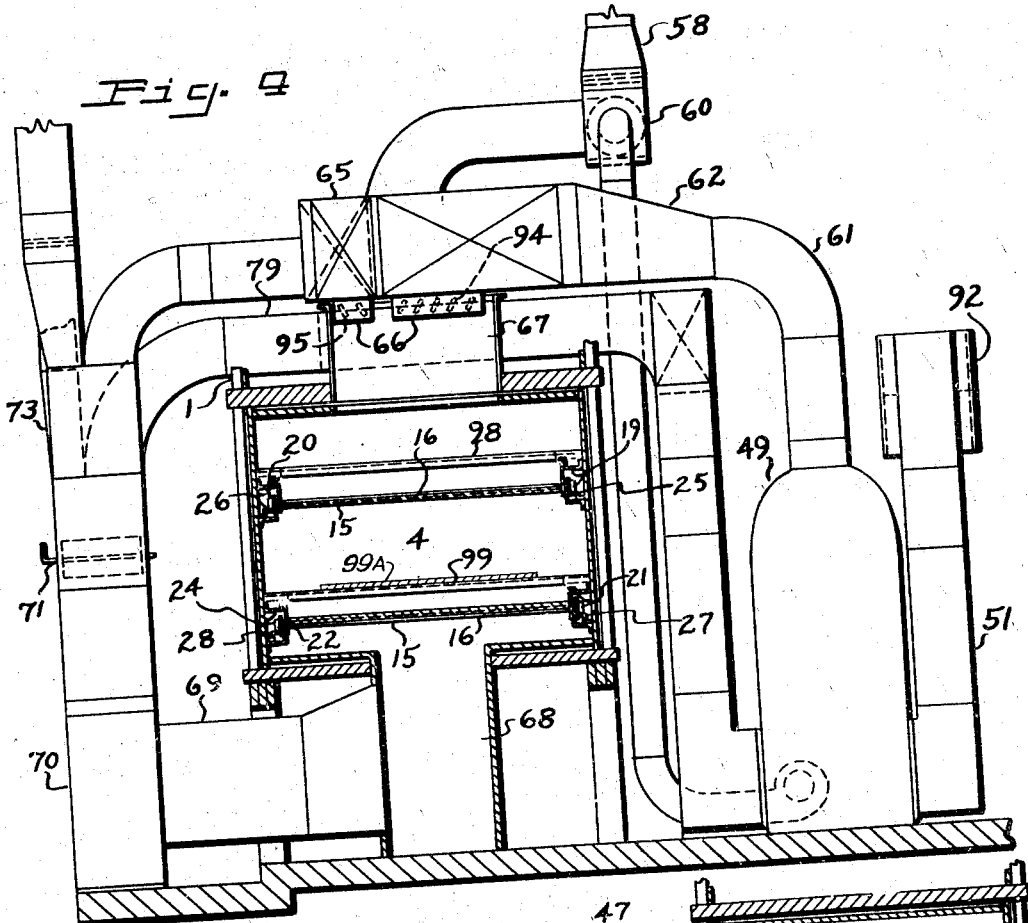

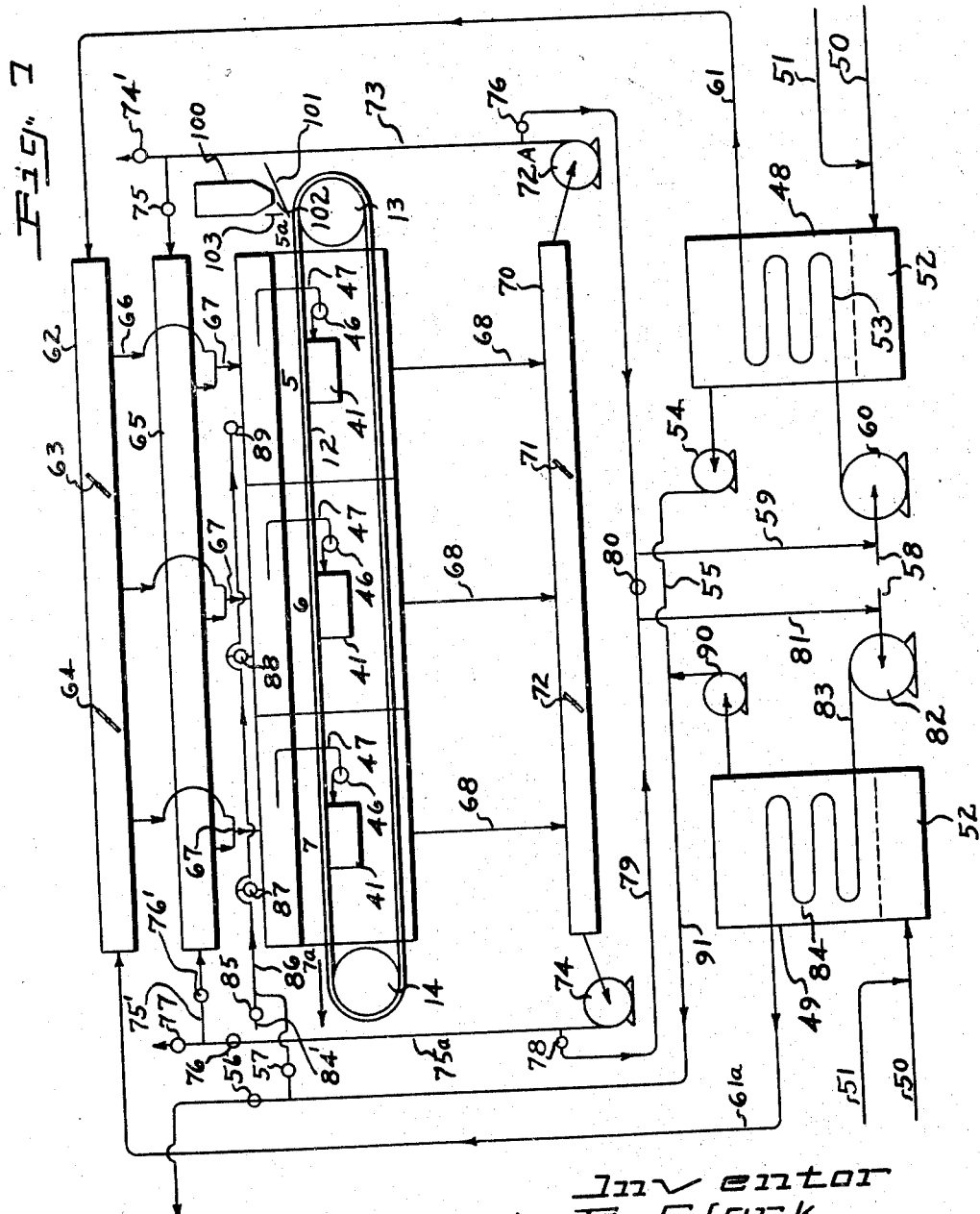

2,432,964

UNITED STATES PATENT OFFICE 2,432,964

CONVEYOR DRIER HAVING PLURAL COMPARTMENTS AND DRYING GAS RECIRCULATION

Louis F. Clark, Pasadena, Calif., assignor to Filtrol Corporation, Los Angeles, Calif., a corporation of Delaware Application January 14, 1944, Serial No. 518,486

3 Claims. (Cl. 34—213)

1

This invention relates to an improved drier for solids. More particularly, it concerns a drier having independently controlled heating sections wherein the draft may be controlled in temperature and humidity.

The drier of this invention in the specific embodiment illustrated in the drawings has an endless belt conveyor passing through a tunnel housing which contains plural inlets for the input of the heating medium. The heating medium passes through the ware being dried on the conveyor belt and generally transversely to the direction of travel of the conveyor. The ware is fed to the endless conveyor and is discharged at the other end. The discharged heating gases are withdrawn and may be recirculated if desired.

By the use of such a conveyor, the wet material can be dried in a single pass through the heated tunnel housing. Variable amounts of material can be fed to the conveyor so that in a given time of passage through the housing the degree of drying can be properly controlled, or with a given feed of material on the drier, the speed of the conveyor can be increased or decreased as may be required to gain the degree of drying which is desired. Flexibility in operation is also obtained by an increase or decrease in the amount or in the relative humidity of the drying gases which are used.

By constructing the heating zones separately from the housing proper, the ware may be heated by convection. This avoids primary reliance on radiant heating as where the source of radiant heat is "seen" by the ware. Also the heating medium can be controlled as to amount, temperature, and humidity to a greater degree than would be possible when the product being dried, or the housing which encloses it, is exposed to the radiant source. The heating medium, thus exteriorly generated, can be directed or recycled through and around the product as may be required to gain the desired drying effect.

Recirculation of this heating medium is provided so that the temperature, volume, and humidity of the total drying gas may be increased or decreased as desired. In addition, this use of separate drying and heating zones and cross-flow of heating medium permits of a greater flexibility in the control of drying conditions. For example, if the ware requires a slow heating at the start of the drying operation, then gentle heating can be applied through the first heater into the first zone of the drier. In the second zone a higher temperature can be applied. In the succeeding zones this temperature can again

2 be decreased should such a heating arrangement be indicated by the particular material undergoing treatment. To make this segregation of zones of heating and drying positive and to insure that there will be separation of heating medium into separate zones, a system of bulkheads and valves is provided to prevent movement of heating medium from zone to zone while permitting the movement of the ware from zone to zone. Means are also provided to independently control the volume, temperature, and humidity of the drying gases passing through each zone. Means are also provided to control direction of flow of heating gases through each zone.

While this drier is adaptable to many types of drying wherein the drying rates need to be controlled throughout the drying period, it is particularly useful in drying pelleted catalyst. In preparing this type of catalyst certain clay materials, such as the sub-bentonites, are activated by an acid treatment and subsequent washing. After de-watering and possibly some drying, they may be pressed, with or without some additive, into a desired shape, as by a mechanical extruder. Such material is particularly susceptible to damage from improper heating. Thus, if the temperature of these pellets is raised too rapidly so that there is insufficient time for the moisture in the pellet to migrate to the surface, some internal expansion may result with consequent disruption and weakening of the pellet. Furthermore, if the humidity is too low, particularly in the initial heating stages, there may be some "case hardening" in the pellets, again resulting in improper preparation of the material.

Such weakening or disruption of the pelleted catalyst is particularly undesirable in certain catalytic operation, as in petroleum conversion, wherein hardness and stability of shape are required in order to support a large load which may be placed in the catalyst case. If fragmentation of the pellet does occur, fine material may obstruct void spaces which act as normal channels for the flow of gases undergoing treatment while passing through the catalyst case.

Since such pelleted material of the required hardness and stability of shape can only be obtained by carefully controlled conditions of humidity and temperature, it is, therefore, an object of my invention to provide an improved drier which will supply such flexibility and proper control to gain this objective.

This invention will be better understood by reference to the drawings which illustrate a preferred embodiment of my invention.

Figs. 1 and 1a are part sectional elevations of the entire drier;

Fig. 2 is an enlarged detailed section of the side plates which are affixed to the side of the conveyor belt in order to keep the material in place, etc.;

Fig. 3 is a plan view of the drier housing together with the heaters, fans, etc.;

Fig. 4 is a transverse sectional view taken on line 4—4 of Fig. 3, showing a part of the drier and the heaters;

Fig. 5 is a vertical section on line 5—5 of Fig. 1, showing the arrangement of the screen conveyor within the housing and the position of the hot gas circulating fan in relation thereto;

Fig. 6 is a detailed sectional view also shown on Fig. 4, showing on an enlarged scale the conveyor roller in position on the track, together with the side and top plates which prevent heat losses; and Fig. 7 is a diagrammatic view, showing the general flow of material on the conveyor belt through the housing and the arrangement of heaters, hot and cold plenums, etc.

Figure 1A:
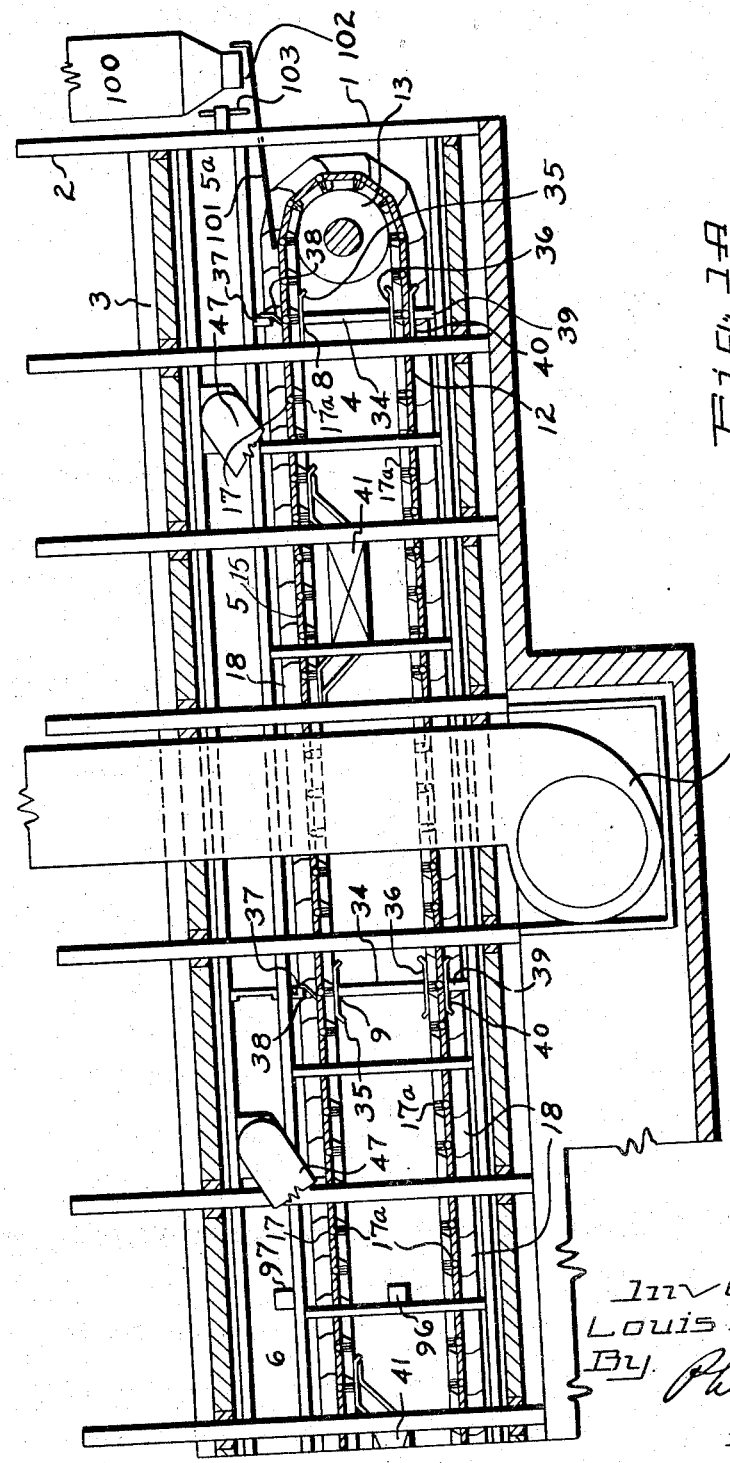

As illustrated generally in Fig. 1, the drier of my invention includes housing 1 in the general form of a tunnel. The size of the housing may be varied in accordance with the intended drying operations. In particular, the length of it may be increased in order to give sufficient detention time for the product being dried, as will be explained hereinafter. The housing is supported and framed by posts 2 and stringers 3. Rigid panels, preferably made of non-combustible, insulated material, may be used as sides to fit against the housing frame. These panels may be made movable and can be fitted to the frame and locked in place by the use of suitable tieing strips, not shown. Thus, by this type of construction, an airtight, insulated housing can be produced.

Chamber 4 of the drier housing is divided into a plurality of drying zones, shown on the drawing as three in number; the first drying zone 5 preceded by a feed zone 5a; the second drying zone 6 and third drying zone 7 succeeded by a discharge zone 7a. The zones 5, 6, and 7 are each of about equal length, although the divisions of zones and their relative length may vary for particular drying operations. Separating these zones are bulkheads, bulkhead 8 being at the feed end of the drier, and 11 at the discharge end. Bulkheads 9 and 10 form separating means in the intermediate portion of the drier. These bulkheads are composed of various sections, as will be shown in greater detail hereinafter.

Operating within housing chamber 4 is an endless conveyor 12. This conveyor is in the general form of a broad metallic perforated belt operating on sprocket wheels 13 and 14. The belt is composed of a plurality of hinged metallic screened segments 15, as shown in Figs. 1, 1a, and 2. These are equal in length to the width of the belt 16 and are hingedly connected to each other by hinge 17 (see Fig. 2) running the width of the belt. Each segment has an upstanding end plate 18 and each end of the segment is so arranged that the plates of the adjacent segment overlap (as shown in Fig. 2). On each side of the hinges 17 the plates are formed with a depending plate 17a running the width of the belt between the plates 18. The width of said plates 17a is sufficient to make contact with the plates 35, as will be further described.

The conveyor is caused to move by means of motor driven sprocket wheel 14, which acts as the driver, and sprocket wheel 13 which acts as the driven. Wheels or rollers 19 and 20, as shown in Figs. 4 and 6, are mounted on axle 23, being placed at regular intervals under the conveyor to act as a support therefor. In a similar manner, wheels 21 and 22 are mounted on axle 24 to support the conveyor in its return course, as will be later shown.

These wheels travel in tracks 25 and 26 which are attached to the framework on either side of chamber 4. A like set of tracks 27 and 28 are provided to carry these wheels on their return run.

The roller and track assemblies are enclosed in housings composed of top 29 and bottom 30 mounted on the frame of the tunnel within the tunnel proper, as shown in Fig. 6, and running the full length of the tunnel. These top and bottom plates are vertically bent to establish vertical sealing members 31 and 32. The separation between the end plates 18 and like vertical members 31 and 32 is just sufficient to permit easy passage. The result of this construction is to form four tunnels for the passage of wheel 20 in its travel from one end of the housing to the other. The four wheel tunnels running the full length of the drier enclose these wheels in the passage through the length of the tunnel drier. This roller tunnel 33 is open to chamber 4 only at each end of the tunnel. They thus communicate with feed zone 7a at one end and with discharge zone 5a at the other end. Four tracks in sealed tunnels are furnished, as shown in Fig. 4. Two of these are for the top and two for the bottom of the conveyor runs.

The tunnel is divided with a plurality of valved bulkheads 8, 9, 10, and 11 extending the width of the tunnel, as previously mentioned. These bulkheads separate the tunnel into separately controlled drying chambers and permit passage of the belt from one chamber or zone to the next chamber or zone, at the same time denying passage of the gases from chamber to chamber through these sealed bulkheads. Each bulkhead, as 9 in Fig. 1, is composed of an impermeable panel 34 carrying valve plate 35 which extends across the width of the bulkheads and along the bottom of the belt and so positioned as to contact with the plates 17a. These plates 35 are in width somewhat greater than the distance between the plates 17a positioned at adjacent hinges 17. In this manner at least one set of plates 17a is in contact with and rides over said plates 35 at all times during the passage of the belt over the plate. In this manner the passage of gas between the bottom of the belt and the valve plate is prevented, thus also preventing the movement of gases from zone to zone. In a similar manner valve plate 36 is attached to the lower end of impermeable panel 34, and the plates 17a in passing in contact with this plate prevent the passage of gas from zone to zone during the return run of the conveyor.

Impermeable panels 37 form the top portion of bulkheads 8, 9, 10 and 11. Its width is the same as the tunnel housing, thus preventing the flow of gases through this section from one zone to the other. At the bottom edge of this top portion of the bulkhead there is a hinged, flexible flap 38 which extends in width across the drier chamber. In its other dimensions it is somewhat greater in length than the distance between impermeable panel 37 and the conveyor. Accordingly it drags loosely on the ware carried on the conveyor or on the conveyor when it is empty, and in this manner prevents the flow of gas from one compartment to the other. At the bottom of chamber 4 and extending across its entire width is another impermeable panel 39, also forming a portion of bulkhead 8. Valve plate 40 is of similar construction and extent to plates 35 previously described. It is so positioned that the flat perforated surface of the belt 6 bears against the plate 40 and prevents gases from the lower portion of the drying chamber from rising through the lower run of the conveyor and passing into the next adjacent zone. Thus, the lower section carries an upper valve plate 36 which bears against the sealing plates 17a and is of such a width that at least one set of plates bears against the valve plate. The bottom valve plate 40 bears agains the other surface of the conveyor, thus sealing the perforations. The wheel tunnels are of such restricted area and of such length and further restricted by the wheels that the resistance to flow of gases from feed zone 5a to discharge zone 7a is relatively great. The pressures in end zone 5 and end zone 7 are approximately equal. This also reduces any migration of gases from one end zone to the other end zone. The result of this construction and operation is that substantially no movement of gases from one end zone to the other end zone occurs. In this manner the chambers are sealed and the return run passes from chamber to chamber without permitting passage of gas from one chamber to the other adjoining chambers and no migration of gases from one drying chamber to any other drying chamber occurs.

Reversing box 41 is placed between the upper and lower runs of endless conveyer 12, being supported on the frame of the drier housing. The top opening of this portion is slightly less in width than is the width of the conveyor belt, as shown in Fig. 5. The length of the opening is sufficient to embrace several of the conveyor segments. The bottom 42 of the reversing box is a flat sheet of metal and is closed, as are also side 43 and the other two sides, not shown. Side 44 is open in part to duct 45 returning into fan 46. The fan, on its suction side, is connected with the top of the drier chamber through duct 47, or, if desired, the suction side of the fan may be connected to duct 45. In this manner a local air current can be created from the top of the particular drying zone in which reversing box is placed through the ware on the endless conveyor belt. This circuit may be thus controlled to be independent of the direction or of the temperature or humidity of the currents of the drier adjacent thereto. If desired, this reversing box and its fans and conduits may be omitted.

The heated drying gas is provided by heaters 48 and 49 which are placed adjacent the drier housing, as shown schematically in Fig. 7 (see Figs. 3 and 7). Combustion gas enters pipe 50 and is mixed with air taken from the atmosphere through line 51. It is then fired in combustion chamber 52 in which is placed heating coil 53. These combustion gases are discharged through fan 54 to the atmosphere through line 55 and open valve 56, or by closing valve 56 and opening valve 57, they may enter drying zone 5, 6, or 7, as will be described later. Air for drying purposes is taken from the atmosphere through line 58 or from the recirculating line 59 then passed into fan 60 where it is forced through heating coil 53. This air from the atmosphere may be passed through air filter 93. This is important if the material being dried is susceptible to contamination by neighboring dusts, gases, etc. A similar filter 92 is also provided on the air intake for heater 49.

Heated drying medium from coil 53 passes through line 61 into hot plenum 62. Here it is controlled in its course by dampers or valves 63 and 64. Similarly, hot drying gas from heater 49 enters the other end of hot plenum 62, so that the zones may be fed by the hot gas from either of these heaters.

Adjacent the hot plenum is placed cold plenum 65 which serves to receive the relatively colder recirculated drying medium. To carry the drying gas from the hot and cold plenums, downcomer 66 carries the gas into mixing throat 67 where recirculated air from the cold plenum 65 may be mixed therewith. This drying gas passes through the conveyor bed and enters duct 68 below the drier housing passing through duct 69 into return conduit 70 where, by closing damper 71, it may be discharged to the atmosphere through fan 72a, line 73, and damper 74'. Or by closing damper 74' and opening damper 75, it can be sent to cold plenum 65. Additionally, by closing dampers 74' and 75 and opening damper 76, damper 80 being closed, the drying air can be returned to heater 48.

In a similar way heater 49 can be operated to supplement the heating media sent to the various zones. For such an operation there has been provided damper 72 in conduit 70 so that when it is closed the return air from zone 7 can be sent through fan 74 and thence through damper 78 to line 79, where, stopped by closed damper 80, it passes through line 81 and fan 82 and thence in line 83 to the heating coil 84 of heater 49. Part or all of the air passing via 74 may be controlled by means of damper 78 and dampers 76 and 77 to permit passage to the atmosphere through line 75a. Preferably all exhaust may be made through line 73 which is the wet end of the system.

Steam or supplementary gas may be introduced into line 84' from a source not shown. By opening dampers 85 and 87, it can be sent through line 86 to zone 7, or by opening either damper 88 or 89, it can be sent to zones 6 and 5, respectively. Combustion gases from heaters 48 and 49 sent through fans 90 and 54 and line 91 may also be routed in a similar fashion to these zones by opening damper 57 and closing damper 56.

As a regulating device, air foil sectional damper vanes 94 are placed in the hot plenum inlet into mixing throat 67, as shown in Fig. 4. A similar set of dampers 95 has been provided in the cold plenum return to this mixing throat. These dampers can be automatically adjusted for the required flow of the respective hot and return gases. Humidostats are placed in each zone, as 96 shown for zone 6, Fig. 1a. It is attached to the tunnel housing below the lower run of conveyor 12 so that it measures and can be used as a regulator of the air after it has passed through the ware on the conveyor. Above the conveyor run at 97 is placed a thermostat used as a control of the temperature of the gas going in to the ware on the conveyor. Similar humidostats and thermostats are located in zones 5 and 7 and are in a similar relation to the conveyor run, or may be varied in position to bring about certain control effects. The humidostat measures relative humidity and the air is regulated by dampers controlled in accordance with arrangements known in the art. The thermostat 97 can be used to control the temperature of the air in a manner known in the art as, for example, by controlling the means for heating the hot air supplied to the hot air duct.

In order to diffuse the flow of gases over the ware on the conveyor 12, diffuser plate 98 has been provided above the top run of the conveyor, as shown in Fig. 4. This diffuser plate is a metal strip with small perforations which cause the gas to diffuse in all directions within the zone rather than largely going directly down below the downcomer. This diffuser plate is a continuous strip extending from wall to wall of the drier housing and from one end of any particular zone to the other. Diaphragm frame 99 is placed below the top run of the conveyor and serves to hold membranes 99a, such as sheets of asbestos paper, in order to obstruct in the degree desired, by proper distribution of such sheets, the air flow from these zones going into suction box 68. By this means the air return can be controlled through any particular zone with respect to the other zones by regulating the pressure drop in each zone. The diaphragm frame is a continuous flat strip extending the width and length of the zone being affixed to the walls therein and having large holes, since it serves simply as a membrane holder.

The material requiring drying is fed from bin 100, as shown in Figs. 1a and 7, onto spreading plate 101. The material in a large column with considerable weight is fed through an opening 102 which is similar in width to the belt. Accordingly, by vertically adjusting gate 103, a varying depth of the material will flow onto conveyor belt 12. By this means control is had of the amount of material flowing through the drier at any particular time.

To discharge the material from the conveyor after it has passed through the drier housing, swing gate 104 opens onto plate 105 when an appreciable weight of the dried material has accumulated at this point. From 105 the ware flows to a conveyor belt going thence to storage bins not shown.

The operation of my drier can be shown in the schematic diagram of Fig. 7 and will be explained in connection with drying of pelleted catalyst. It is, however, not intended as a limitation of the utility of my drier.

Pelleted catalytic material is fed from bin 100 through bin mouth 102 and gate regulator 103 onto plate 101, and thereafter onto the conveyor in the feed zone 5a. Thus it is spread directly onto the screen segments of conveyor 12 in the degree of thickness indicated for any particular spreading sequence. That is, if the material is readily dried, or if a relatively large draft of warm gases is passing through the drier housing, then it may be desirable to use a thicker bed of the pellets than otherwise. In its course of travel the ware passes through bulkhead 8 into zone 5 where the first drying operation takes place. When passing over reversing box 41, it may get some supplemental passage of air, as will be detailed hereinafter. In a similar way it passes through bulkhead 9 and into zone 6, thence through bulkhead 10 and into zone 7. When passing through bulkheads, the hinged flaps, as 38, drag on the top of the ware, thus effecting closure of the bulkheads at these points. The conveyor and ware then enter the discharge zone 7a. When the ware has passed through the drier housing it is discharged through swing gate 104 onto plate 105, being fed to a conveyor belt which leads to bins, not shown.

While the pelleted catalyst is travelling through the respective zones as detailed above, the drying medium is generated in heaters 48 and 49. Gas is drawn through line 50 with air for combustion through line 51, entering combustion chamber 52 where it acts as a source of heat for coils 84 and 53. The products of combustion flow from the top of the heating chambers 48 and 49, going through fan 54 and fan 90 into lines 55 and 91 through damper 56, whereafter it is discharged to the atmosphere. By closing damped 56 and opening damper 57, it may be directed into line 86, flowing through valve 87 into zone 7, or it may be sent to zones 6 and 5, in whole or in part, by the proper regulation of dampers 88 and 89. Air to be used as a heating medium enters line 58, passes through fans 60 and 82, into heating coils 53 and 84, and thence to lines 61 and 61a where it enters hot plenum 62. If desired, damper 63 can be closed to prevent flow of the gas from line 61 into the other zones, whereupon the gas flows down downcomer 66 into mixing throat 67, entering drying zone 5. Here the gas is diffused by means of diffuser plate 98, shown in greater detail in Fig. 4. The gas then passes onto the pellets which are spread on the conveyor as previously shown. Since the passage of this air is continuous, it carries away the moisture from the individual pellets which are loosely packed, thus permitting the flow of hot gases around the individual particles, and in this manner moisture is first absorbed from the surface of the pellets and later migrates from the interior as the drying is advanced. The air can be recirculated through reversing box 41, passing through recirculating fan 46 and into the top of the drying zone 5 by means of fans and lines given in detail in the description of Fig. 5, or this air current may be reversed in direction, taking air from the top of zone 5 and discharging it below the conveyor run into reversing box 41. This provides a zone of local circulation independent of the warm stream through the zone. Drying gas then passes through line 68 into return conduit 70 where, with the closing of damper 71, it enters fan 72 to be returned into line 59 upon the closing of damper 80. From here it mixes with the air taken from the atmosphere at 58 and is again sent through fan 60 into heating coil 53, etc.

Alternative to recirculation of return air back into heater 48, such air may be sent into cold plenum 65 by closing dampers 76 and 74' and opening damper 75. A controlled amount flows from the cold plenum through sectional damper vane 95 into mixing throat 67 where it is mixed with hot air from hot plenum 62, as previously described. Such mixture of hot and cold air is made with respect to the condition of the ware undergoing treatment. For example, if a high humidity is desired in first zone 5 to prevent case hardening of the catalyst pellets, it might be desirable to use a greater quantity of air from cold plenum 65 with its relatively higher humidity. Upon the mixing of the air from the hot and cold plenums in the mixing throat 67, circulation thereafter follows the alternative path as previously indicated.

Heater 49 generally supplies hot air to the last zone 7 in a similar manner to heater 48, as previously described. This is effected by closing damper 64, or, should it be opened in whole or in part, this hot air can be sent to zone 6. Additional hot air from heater 48 can be sent to zone 6 by opening damper 63 in whole or in part.

Recirculated air from the return conduit 70 can be returned by way of fan 74 by closing damper 76, opening damper 78, and closing damper 80 on line 79. Alternatively, this used air may be discharged to the atmosphere through valve 77 when valve 78 is closed, or it may be sent in the cold plenum through line 75a by opening valve 76'. Here in the cold plenum, the somewhat humid air may be used in the various zones as brought about by the automatic damper controls in the respective mixing throats.

It is also to be noted that combustion gas from heater 49 passes through fan 90 into line 91 and through valve 56 to be discharged to the atmosphere, or with valve 56 closed and valve 57 opened and valve 85 closed, it passes through auxiliary line 86 and into the respective zones as may be required by opening the valves 87, 88, or 89.

Particularly if it should be desired to increase the humidity of the drying gases, live steam, as 100 pounds gauge, may enter at 84', passing through valve 85 and into line 86 with distribution to the various zones, as previously detailed, or some other gas may enter at this point.

In my preferred operation, all of the fresh air passes through the heater 49 and is raised to the desired high temperature, the hot gas passing through the zone 7 and thence through blower 74 and damper 80 to the heater 48, whereupon it is reheated and introduced into the zone 5. The discharge from zone 5 passes via blower 72 to atmosphere and in part is returned to the cold plenum. By adjusting the dampers 63, 64, 71 and 72, the flow of hot gases through zone 6 may be adjusted to obtain the desired distribution of drying load between the three zones. The flow of the drying gases is thus made generally countercurrent to the flow of the ware. By adjusting the dampers 71 and 72, the recirculation of the selective discharge gases from zones 6 and 7 into the discharge conduit may be controlled to adjust the humidity and temperature of the gases in the cold plenum.

While I have described a particular embodiment of my invention for the purpose of illustration, it should be understood that various modifications and adaptations thereof may be made within the scope of the appended claims.

I claim:

1. A continuous drier, comprising a tunnel, a plurality of tracks supported on the walls of said tunnel, a plurality of wheels operating on said tracks, a continuous belt composed of hinged sections supported on said wheels, an enclosure for said wheels and tracks, a plurality of bulkheads separating said tunnel into zones, said enclosure sealing said wheels from said zones, conduits for introducion of gases into said zones, conduits for discharge of gases from said zones, said bulkheads carrying a hinged flap bearing against one side of the upper run of said belt, a plate bearing against the hinges underneath the upper flight of said belt, said plate being equal in length to the width of said belt and in width at least equal to the distance between the hinges of said hinged sections, a lower plate bearing against the bottom of the return run of said belt, a third plate bearing against the hinges of the return run of said belt, heating means positioned externally of said tunnel for generating a stream of drying gases, a hot plenum communicably connected to said heating means, valved conduits connecting said plenum to said zones, a gas discharge from said zones, a cold plenum, valved conduits connecting said discharge to said cold plenum, valved conduits connecting said cold plenum to said zones, fans for moving said hot gas to said hot plenum and to said zones, and fans for moving said discharge gases to said cold plenum and to said zones.

2. A drier, comprising a tunnel, bulkheads in said tunnel dividing said tunnel into more than two zones, a belt in said tunnel, means for moving said belt from zone to zone, a plurality of heating means positioned externally of said drier for generating drying gases, an elongated hot plenum communicably connected at both ends thereof to said heating means, separate conduits connected to said hot plenum at intermediate points thereof and to said zones, and dampers in said plenum positioned between said conduits for distributing gases in said hot plenum selectively to said conduits for passage to said zones, whereby hot gases may be introduced selectively from said heating means to said hot plenum and hot gases from selected heating means may be distributed through said hot plenum and introduced to selected zones.

3. A drier, comprising a tunnel, bulkheads in said tunnel dividing said tunnel into zones, a belt in said tunnel, means for moving said belt from zone to zone, a plurality of heating means positioned externally of said drier for generating drying gases, an elongated hot plenum communicably connected at both ends thereof to said heating means, separate conduits connected to said hot plenum at intermediate points thereof and to said zones, dampers in said plenum positioned between said conduits for distributing gases in said hot plenum selectively to said conduits for passage to said zones, whereby hot gases may be introduced selectively from said heating means to said hot plenum and hot gases from selected heating means may be distributed through said hot plenum and introduced into selected zones, and a gas seal between said zones, said belt travelling through said seal.

LOUIS F. CLARK.

REFERENCES CITED

The following references are of record in the file of this patent:

UNITED STATES PATENTS

| Number | Name | Date |
|---|---|---|
| 655,513 | Proctor | Aug. 7, 1900 |
| 948,751 | Whitlatch | Feb. 8, 1910 |
| 1,737,259 | Miller | Nov. 26, 1929 |
| 1,750,839 | Furbush | Mar. 18, 1930 |
| 1,788,099 | Fulmer | Jan. 6, 1931 |
| 2,062,025 | Harrington | Nov. 24, 1936 |
| 2,062,193 | Smith et al. | Nov. 24, 1936 |
| 2,125,382 | Lykken et al. | Aug. 2, 1938 |
| 2,308,508 | Harrington | Jan. 19, 1943 |
| 2,336,698 | Morrill | Dec. 14, 1943 |

FOREIGN PATENTS

| Number | Country | Date |
|---|---|---|
| 327,409 | Great Britain | Mar. 31, 1930 |
| 336,009 | Great Britain | Oct. 9, 1930 |